Feb. 19, 1952     H. C. STIEGLITZ     2,585,973
MILLING MACHINE AND METHOD FOR IMPELLER WHEEL MANUFACTURE
Filed April 1, 1948     2 SHEETS—SHEET 1
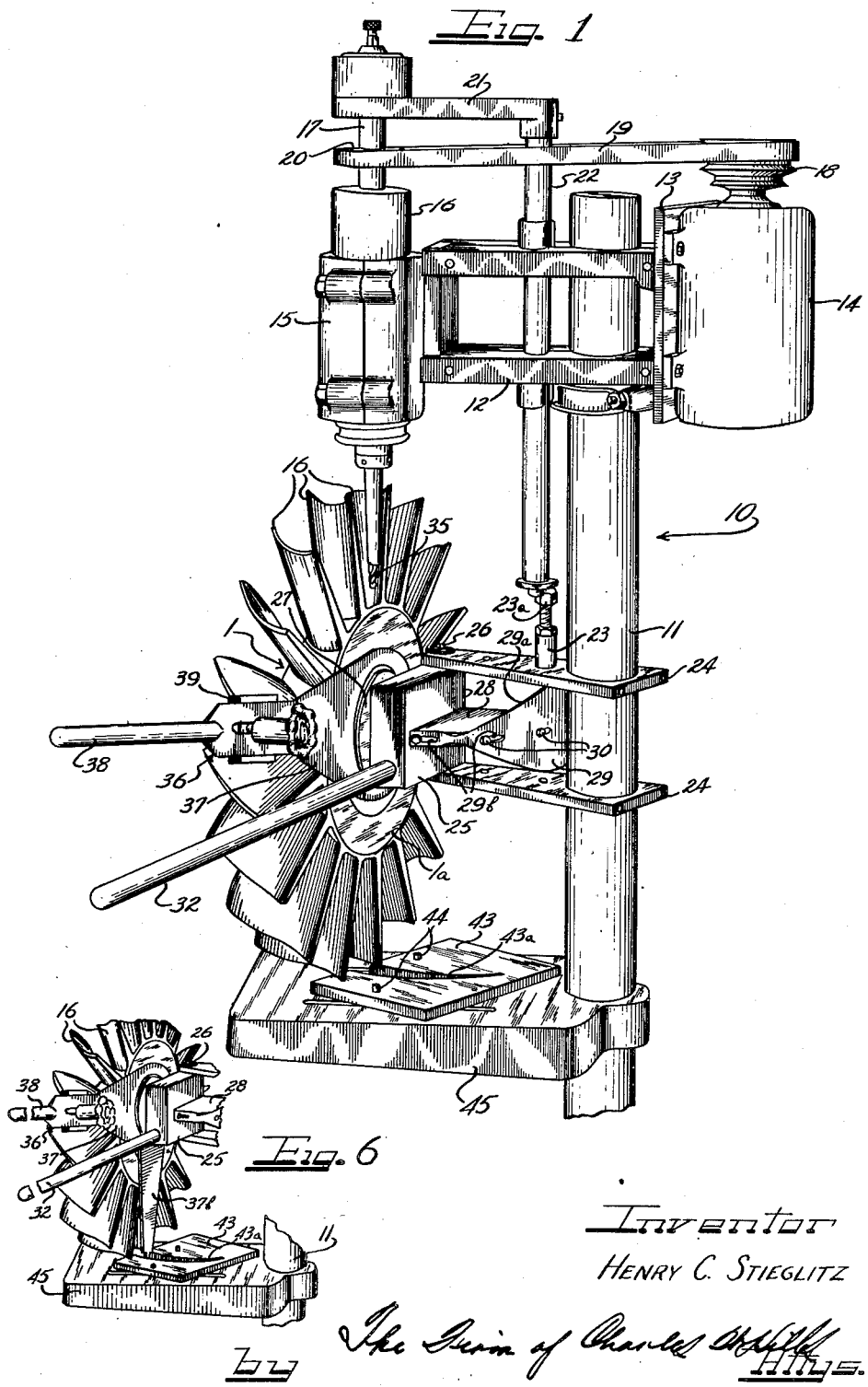
Inventor
HENRY C. STIEGLITZ

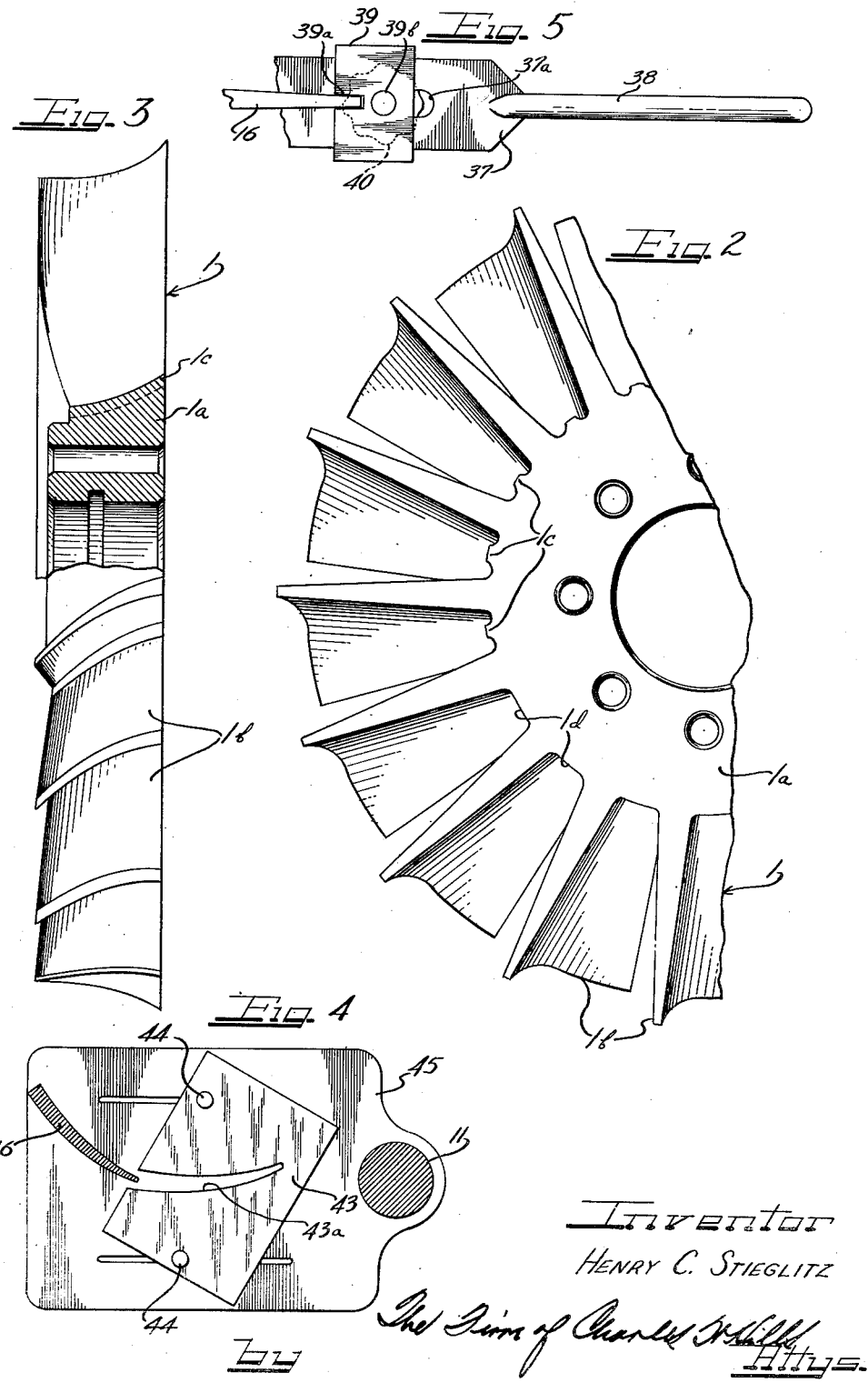

Patented Feb. 19, 1952

2,585,973

UNITED STATES PATENT OFFICE 2,585,973

MILLING MACHINE AND METHOD FOR IMPELLER WHEEL MANUFACTURE

Henry C. Stieglitz, Cleveland, Ohio, assignor to Thompson Products, Inc., Cleveland, Ohio, a corporation of Ohio Application April 1, 1948, Serial No. 18,464

11 Claims. (Cl. 90—20)

This invention relates to a machine tool, particularly to a machine tool adapted to mill, grind, or otherwise machine the integral hub portions lying between successive vanes on an impeller wheel, or similar workpiece.

In the fabrication of impellers or similar workpieces wherein a plurality of circumferentially spaced vanes are integrally formed on a central hub portion, it has been customary in recent years to form such vanes by milling operations. Since each of such vanes is of relatively complex configuration, and generally has an arcuate contour in a cross-sectional plane, the milling of such vanes has necessarily resulted in an irregular contour of metal being left in the hub portions intermediate each pair of successive vanes. For efficient operation of the impeller wheel, it is necessary that the hub portion be properly finished to a smooth and accurate contour. This, however, is a matter of some difficulty to accomplish automatically by a machine tool, due to the fact that the relatively small spacing between the vanes makes it diffcult to bring a cutting tool into engagement with the hub portion without cutting, gouging or otherwise marring the surface of the adjacent finished blade. The problem is rendered more acute in those types of impellers which employ an axially tapering configuration of the hub portion. Hence, notwithstanding the high cost involved in hand finishing operations, such were heretofore largely employed in finishing the hub contours of impeller units.

Accordingly, it is an object of this invention to provide an improved machine tool and machining method, particularly a machine tool operating according to the method which will conveniently, yet accurately, finish the hub contour of an impeller or similar workpiece to a desired configuration.

A particular object of this invention is to provide an improved machine tool and method for milling the hub contours of an impeller wherein a rotary cutting element is caused to move between any two adjacent vanes of an impeller wheel along a path which conforms generally to the root contour of such vane, and the rotary cutting element is concurrently oscillated in a direction transverse to the first mentioned movement so as to insure the machining of the entire hub portion lying between the two vanes.

Another object of this invention is to provide an improved machine for finishing the hub portion of an impeller wheel wherein the relative movements of the rotating cutter and the impeller workpiece are manually produced and yet are positively interrelated so that the rotating cutter will produce the desired hub contour between any pair of adjacent vanes without contacting the vane surfaces.

The specific nature of this invention, as well as other objects and advantages thereof will become apparent to those skilled in the art from the following detailed description of the annexed sheets of drawings which, by way of preferred example only, illustrate one specific embodiment of the invention.

On the drawings:

Figure 1 is a perspective view of a machine tool embodying this invention showing it in operative relationship to an impeller workpiece;

Figure 2 is a partial elevational view of an impeller workpiece, showing the hub contours of the impeller before and after the finishing operation by a machine tool embodying this invention;

Figure 3 is a side elevational view, partly in section, of the impeller wheel of Figure 2;

Figure 4 is a sectional view taken on a horizontal plane in Figure 1 located immediately above the guide plate;

Figure 5 is a partial elevational view illustrating the cooperation of the oscillating handle with an impeller vane; and Figure 6 is a reduced scale, partial perspective view of a machine incorporating a modification of the invention.

As shown on the drawings:

While the drawings and the following description refer to the use of a milling cutter as the rotary tool element, those skilled in the art will recoginze that the principles of this invention are equally applicable to other forms of rotary cutters as well as to rotary abrasive elements. The choice of the rotary tool depends entirely upon the depth of cut required and the smoothness of the surface finish desired.

Referring particularly to Figures 2 and 3, there is shown a workpiece I for which a machine tool embodying the principles of this invention is especially applicable. Such workpiece may, for example, comprise an impeller which is of the type having a hub portion 1a and a plurality of circumferentially spaced, generally radially extending vane portions 1b. As used in this application, the term "impeller" is employed generically to designate any element having circumferentially spaced fluid guide vanes thereon, including, of course, turbine wheels and inducers. In accordnace with modern manufacturing technique, such vane portions may be integrally formed from a cylindrical blank by milling operations thereon, but, due to the complex configuration of such vane elements, such milling operations necessarily leave an uneven hub contour between adjacent vanes as indicated at 1c in the drawings. Such uneven or irregular hub contour is generally in the form of a ridge lying intermediate the finished vane surfaces. For optimum adiabatic efficiency, the impeller hub portion should be finished as indicated at 1d in the drawings to provide a smooth regular contour. In addition, in many forms of impellers now in widespread use, the hub partakes of an axially tapering contour, flaring outwardly along its axial length, as is best shown in the sectionalized portion of Figure 3.

This invention therefore provides a method and apparatus for finishing the irregular hub contour 1c of an impeller wheel or similar workpiece to the desired contour 1d. While not limited thereto, a machine tool embodying this invention can be conveniently fabricated by modification of a conventional drill press. Thus, referring to Figure 1, the machine 10 comprises a drill press frame structure which primarily constitutes a main vertical supporting post 11. Near the top of the post 11, a bracket structure 12 is provided which is rigidly clamped to the post 11 in any convenient manner. Bracket 12 provides support for a vertical plate 13 upon which any suitable prime mover, such as an electric motor 14, is mounted with its axis in a generally vertical position. At the other end of bracket 12, a bearing housing 15 is rigidly secured, which, in turn supports a bearing sleeve 16 which is axially movable with respect to bearing housing 15. Within bearing sleeve 16, a vertical cutter spindle 17 is journaled in conventional manner, hence is both rotatably and axially movable with respect to the bearing housing 15. Rotational movement is imparted to the spindle 17 through a belt drive comprising a pulley 18 on the shaft of motor 14, a belt 19, and a pulley 20 secured to the spindle 17.

At its top end, the spindle 17 is axially secured to an arm 21 which in turn is mounted on and secured to a slide rod 22 which is slidably journaled for vertical movements by the bracket 12. The bottom end of slide rod 22 is supported by a cam follower plunger 23 which controls the vertical position of slide rod 22 and hence of cutter spindle 17 in a manner which will be later described. Limited vertical adjustment of the initial position of the cutter spindle may be obtained by a bolt 23a threadedly mounted in the top of plunger 23.

A pair of support plates 24 are rigidly secured in vertically spaced relationship to the lower portion of main post 11. At the outer ends of the support plates 24, a sub-frame structure 25 is pivotally mounted as on a vertical pin 26. Sub-frame 25 may partake of any desired configuration but is here shown as comprising a solid rectangular block member. On the front face of the sub-frame block 25, a spindle or post 27 is rigidly secured thereto in any convenient manner and such post is suitably dimensioned as to permit a workpiece, such as the impeller 1, to be journaled thereon for rotation about its natural axis. Any desired form of retaining element (not shown) may be provided to secure the impeller 1 on the post 27 but to freely permit rotational movement of the impeller about the post.

On the rear face of the sub-frame block 25, a projecting rib 28 is provided which has an arcuate segment periphery. Around such periphery, a cam member 29 is mounted, such cam member having an active surface 29a which is of varying vertical height around the arcuate periphery of the cam 29. The cam 29 may be secured to the rib 28 in any desired manner, such as by a plurality of bolts 30 which pass through elongated slots 29b in the cam 29. Such slots thus permit a limited amount of adjustment of the position of cam 29 with respect to the angular position of the sub-frame block 25. The cam follower plunger 23 projects downwardly through a suitable guiding aperture in the top support plate 24 and rests upon the cam surface 29a. Hence, it is apparent that as the sub-frame block 25 is pivoted with respect to the support plates 24, the axial position of the spindle 17 will be varied according to the contour of cam surface 29a. While such pivoting movement of the sub-frame block 25 may obviously be accomplished by a power mechanism, for simplicity of illustration, a handle 32 is shown as constituting the means for pivoting the sub-frame block.

From the construction thus far described, it is apparent that manually produced rotation of the sub-frame block 25 will cause a relative movement between the impeller wheel 1 and the cutter spindle 17 so as to permit the cutter spindle to pass between a pair of vanes 1b which are suitably aligned therewith. Furthermore, by properly proportioning the extent of offset of the axis of the impeller wheel 1 with respect to the pivotal axis defined by the pivotal support 26 for the sub-frame block 25, the cutter spindle 17 may be made to pass between any two successive vanes 1b along a path which closely approximates the contour of at least one of the adjacent vanes. Therefore, by mounting a cutting element 35 on the end of cutter spindle 17, such, for example, as a conventional tapered end mill, the end mill 35 may be made to produce a cut along the hub portion of the impeller wheel 1 along a path which will closely approximate the arcuate contour of the base of the adjacent vane.

With the described arrangement, to completely machine any particular hub portion lying between two adjacent vanes, it is only necessary to oscillate the impeller wheel 1 about its natural axis a sufficient distance to traverse the rotary cutter 35 from a position adjacent one vane surface to a position adjacent the opposite vane surface while the cutter is concurrently passing axially between the vanes. Such oscillating movement may be conveniently imparted to the impeller wheel 1 by a handle structure 36. Such handle structure comprises a base plate portion 37 which is suitably apertured so as to permit its mounting in freely rotatable relationship on the impeller support post 27. A grasping arm portion 38 is rigidly secured to the base plate portion 37 and projects beyond the periphery of impeller wheel 1 so as to be capable of convenient manipulation by the operator. To transmit oscillating movements of the handle structure 36 to the impeller wheel 1, a latching block 39 is provided which may be secured against one face of the base plate portion 37 in a desired radial position relative to impeller wheel 1 through the cooperation of a clamping bolt 40 with an elongated radial slot 37a provided in the base plate 37. The end of bolt 40 is threadably engaged in a suitable hole 39b in block 39. As is best shown in Figure 5, the latching block 39 has a notch 39a formed in one face thereof which is proportioned so as to snugly engage the tip of an adjacent vane 1b of the impeller 1. When thus engaged, and when the clamping bolt 40 is tightened, it is apparent that impeller 1 will be co-rotatably secured to the handle structure 36 and hence oscillation of such handle structure will result in a corresponding oscillation of impeller 1 about its natural axis.

It should be noted that the latching block 39 also provides a convenient means for indexing the impeller 1 so that the cutter may operate upon the successive hub portions of the impeller 1. To effect such indexing, it is necessary only to release the clamping bolt 40, move the latching block 39 radially outwardly to clear the impeller vanes 1b, advance the impeller 1 by an amount sufficient to bring the next vane into alignment with the notch 39a of the latching block 39, and then move the latching block 39 inwardly to engage the next vane and reclamp the latching block 39 in position on the handle structure 36.

While the structure heretofore described will permit the finished machining of the irregular hub portion 1c of the impeller 1 to produce the smooth finish contour 1d, it is apparent that great care would have to be exercised in order to prevent the manual oscillations of the impeller 1 being of sufficient extent so that the cutter 35 engages the adjacent vane surfaces to cut or mar the same. To eliminate this possibility, a cam or guide plate 43 is provided which is adjustably mounted by bolts 44 upon a bed plate 45 secured in any desired manner to the main support post 11 in a position underlying the impeller 1. Plate 43 is in turn provided with an arcuately extending slot 43a which, in the modification of Figures 1–5, is suitably located so that the tip end of one of the impeller vanes 1b will project into such slot during the pivotal movement of the impeller 1 produced by the pivoting of the sub-frame block 25 with respect to the support plates 24. Furthermore, the distance between the opposed wall surfaces defining the slot 43a is carefully dimensioned so as to permit an arcuate extent of oscillation of the impeller 1 about its natural axis which is sufficient to engage the rotary cutter 35 with all portions of the hub surface but yet will not permit the rotary cutter 35 to contact the surfaces of the adjacent vanes. Since the circumferential spacing between any two adjacent vanes of an impeller generally varies along the axis of the impeller, the necessary variation of the extent of oscillation of the cutter may also be conveniently accomplished by suitable variation of the width of the slot 39a, as is best shown in Figure 4.

Alternatively, in the modification of Figure 6, the limiting of the oscillating movement of the impeller may be effected by the cooperation of a depending projection 37b, integrally formed on base plate portion 37, with the guide slot 43a.

It is, therefore, apparent that the concurrent application of the pivoting movement of the sub-frame block 25 plus an oscillating movement of the handle structure 36 will cause the rotary cutter 35 to traverse all portions of the impeller hub lying between any two adjacent vanes to finish machining such hub portions to any desired contour. In the event that the impeller hub contour requires an axially tapered configuration, the cooperation of the cam 29 with the support rod 22 produces the necessary axial shifting of the cutter 35 concurrently with the pivotal movement of the impeller so as to accurately reproduce the desired tapering contour.

Hence, the method and machine embodying this invention will permit machining operations to be performed on the hub portions of an impeller wheel, or similar workpiece, with a far greater degree of accuracy and convenience than has heretofore been possible. Since a power driven cutting tool is employed, it is apparent that the hub finishing operation may be rapidly and economically completed; yet all possibility of damage to the finished vane surfaces is substantially eliminated.

It will, of course, be understood that various details of construction or procedure may be modified through a wide range without departing from the principles of this invention and it is, therefore, not the purpose to limit the patent granted hereon otherwise than necessitated by the scope of the appended claims.

I claim as my invention:

1. Apparatus for milling the hub portion of an impeller wheel lying between two radial vanes thereof comprising a frame, a rotary cutter journaled on said frame, means for rotating said cutter, a sub-frame pivotally mounted on said frame, means on said sub-frame for journaling an impeller wheel for rotative movements about its natural axis, said sub-frame being located relative to said cutter so that said cutter passes between two vanes of the impeller wheel by pivotal movement of said sub-frame, means for pivotally moving said sub-frame, and means for concurrently oscillating the wheel through a limited arc about its natural axis, whereby said rotary cutter traverses all of the hub portion of the impeller lying between the two vanes.

2. Apparatus for milling the hub portion of an impeller wheel lying between two radial vanes thereof comprising a frame, a rotary cutter journaled on said frame, means for rotating said cutter, a sub-frame pivotally mounted on said frame, means on said sub-frame for journaling an impeller wheel for rotative movements about its natural axis, said sub-frame being located relative to said cutter so that said cutter passes between two vanes of the impeller wheel by pivotal movement of said sub-frame, means for pivotally moving said sub-frame, means for concurrently oscillating the wheel about its natural axis, whereby said rotary cutter traverses all of the hub portion of the impeller lying between the two vanes, and means for limiting the oscillating movements of said wheel to prevent contact of the rotating cutter with the vanes.

3. Apparatus for milling the hub portion of an impeller wheel lying between two radial vanes thereof comprising a frame, a rotary cutter journaled on said frame, means for rotating said cutter, a sub-frame pivotally mounted on said frame, means on said sub-frame for jounaling an impeller wheel for rotative movements about its natural axis, said sub-frame being located relative to said cutter so that said cutter passes between two vanes of the impeller wheel by pivotal movement of said sub-frame, means for pivotally moving said sub-frame, a cam plate on said frame, said cam plate defining spaced cam surfaces engageable by an impeller vane to limit the oscillating movements of said wheel to prevent contact of the rotating cutter with the vanes.

4. Apparatus for milling the tapered hub portion lying between two radial vanes of an impeller wheel comprising a frame, a rotating cutter journaled in said frame for both rotational and axial movements, a cam follower controlling the axial movements of said rotating cutter, a sub-frame pivotally mounted on said frame, means on said sub-frame for journaling an impeller wheel for rotative movements about its natural axis, said sub-frame being located relative to said rotary cutter so that the cutter passes between two vanes of the impeller wheel by pivotal movement of said sub-frame, means for pivotally moving said sub-frame, a cam secured to said sub-frame and cooperating with said cam follower to shift said cutter axially as said sub-frame pivots, and means for concurrently oscillating the wheel through a limited arc about its natural axis, whereby said rotary cutter traverses all of the tapered hub portion of the impeller lying between the two vanes.

5. Apparatus for milling the tapered hub portion lying between two radial vanes of an impeller wheel comprising a frame, a rotating cutter journaled in said frame for both rotational and axial movements, a cam follower controlling the axial movements of said rotating cutter, a sub-frame pivotally mounted on said frame, means on said sub-frame for journaling an impeller wheel for rotative movements about its natural axis, said sub-frame being located relative to said rotary cutter so that the cutter passes between two vanes of the impeller wheel by pivotal movement of said sub-frame, means for pivotally moving said sub-frame, a cam secured to said sub-frame and cooperating with said cam follower to shift said cutter axially as said sub-frame pivots, means for concurrently oscillating the wheel about its natural axis, whereby said rotary cutter traverses all of the hub portion of the impeller lying between the two vanes, and means for limiting the oscillating movements of said wheel to prevent contact of the rotating cutter with the vanes.

6. Apparatus for milling the tapered hub portion lying between two radial vanes of an impeller wheel comprising a frame, a rotating cutter journaled in said frame for both rotational and axial movements, a cam follower controlling the axial movements of said rotating cutter, a sub-frame pivotally mounted on said frame, means on said sub-frame pivotally mounted on said frame, means on said sub-frame for journaling an impeller wheel for rotative movements about its natural axis, said sub-frame being located relative to said rotary cutter so that the cutter passes between two vanes of the impeller wheel by pivotal movement of said sub-frame, means for pivotally moving said sub-frame, a cam secured to said sub-frame and cooperating with said cam follower to shift said cutter axially as said sub-frame pivots, a guide member on said frame, said guide member defining spaced surfaces engageable by an impeller vane to limit the oscillating movements of said wheel to prevent contact of the rotating cutter with the vanes, and means for oscillaing said wheel about its natural axis.

7. The combination defined in claim 6 wherein said spaced surfaces are respectively defined by the opposed walls of a slot in said guide member.

8. The combination defined in claim 1 wherein said means for oscillating the impeller wheel comprises a handle having latching means thereon adapted to engage any selected one of the impeller vanes, and means for detachably positioning said latching means in engaging relation with a selected blade, whereby the impeller wheel may be successively indexed to machine each vane hub portion.

9. The combination defined in claim 1 wherein said means for oscillating the impeller wheel comprises a handle, said handle having a base portion freely rotatable on said sub-frame about the impeller wheel axis and a radially extending arm portion, a catch member mounted on said handle for radial movement, means on said catch member for engaging a vane of the impeller wheel in one radial position relative to said handle, and means for detachably securing said catch member to said arm in said one radial position, whereby the impeller wheel may be successively indexed about its natural axis on said sub-frame.

10. Apparatus for milling the hub portion of an impeller wheel lying between two radial vanes thereof comprising a frame, a rotary cutter journaled on said frame, means for rotating said cutter, a sub-frame pivotally mounted on said frame, means on said sub-frame for journalling an impeller wheel for rotative movements about its natural axis, said sub-frame being located relative to said cutter so that said cutter passes between two vanes of the impeller wheel by pivotal movement of said sub-frame, means for pivotally moving said sub-frame, a handle structure for concurrently oscillating the wheel through a limited arc about its natural axis, whereby said rotary cutter traverses all of the hub portion of the impeller wheel lying between the two vanes, a fixed cam plate defining a cam slot, and a projection on said handle structure engageable in said cam slot to limit the extent of oscillating movement of said impeller wheel about its axis to prevent contact of the rotating cutter with either of the two vanes.

11. Apparatus adapted for milling the hub portion of an impeller wheel lying between two adjacent vanes radiating from the hub which comprises a work support for the wheel, a cutter support for holding a cutter tool to project into the space between the two adjacent vanes, means for rotating the cutter support to rotate the cutter tool about its own axis, first means for shifting the cutter support to move the cutter tool along its own axis for controlling the radial depth of the cutting path along the hub, second means for shifting the work support laterally of the axis of the cutter tool for controlling the axial cutting path along the hub, third means for oscillating the work support a plurality of times in a direction transverse to the movement imparted by said second means for controlling the cutting path along the width of the hub portion between said vanes, and means for automatically controlling said first means from said second means.

HENRY C. STIEGLITZ.

REFERENCES CITED

The following references are of record in the file of this patent:

UNITED STATES PATENTS

| Number | Name | Date |
|---|---|---|
| 569,054 | Purdy | Oct. 6, 1896 |
| 1,193,049 | Olson | Aug. 1, 1916 |
| 1,775,184 | Abbott | Sept. 9, 1930 |
| 2,043,810 | Prickett | June 9, 1936 |
| 2,215,171 | Chalupa | Sept. 17, 1940 |
| 2,269,200 | Hillner | Jan. 6, 1942 |
| 2,352,489 | Melin | June 27, 1944 |
| 2,386,880 | Osplack | Oct. 16, 1945 |
| 2,429,324 | Meisser | Oct. 21, 1947 |
| 2,431,604 | Birmann | Nov. 25, 1947 |
| 2,449,179 | Scharping | Sept. 14, 1948 |
| 2,480,807 | De Vlieg | Aug. 30, 1949 |